P. J. DELANEY.
BAKE OVEN
APPLICATION FILED MAY 15, 1919.

1,370,008.

Patented Mar. 1, 1921.
3 SHEETS—SHEET 1.

WITNESSES

INVENTOR
BY
ATTORNEYS

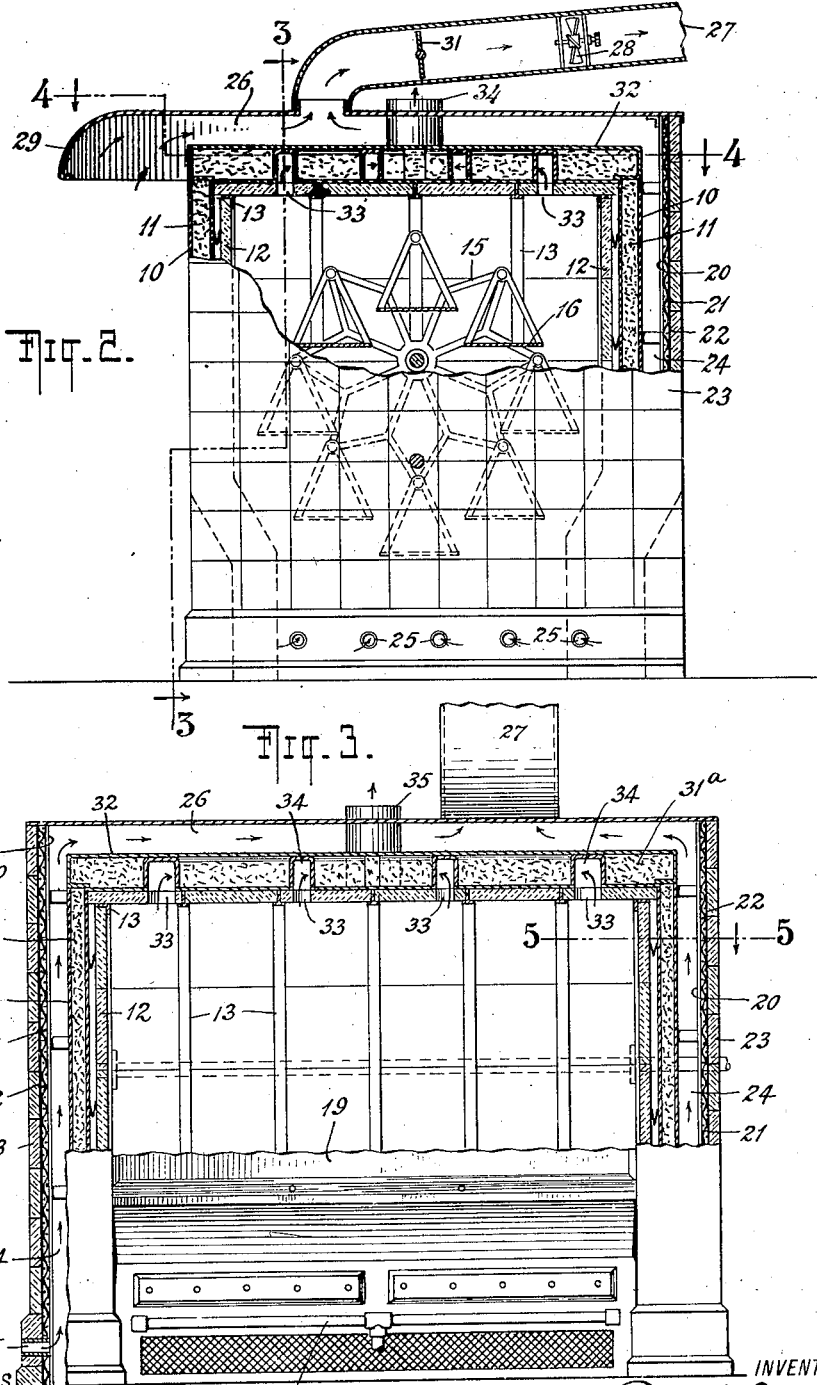

P. J. DELANEY.
BAKE OVEN
APPLICATION FILED MAY 15, 1919.

1,370,008.

Patented Mar. 1, 1921.
3 SHEETS—SHEET 3.

UNITED STATES PATENT OFFICE.

PAUL J. DELANEY, OF NEW YORK, N. Y.

BAKE-OVEN.

1,370,008. Specification of Letters Patent. Patented Mar. 1, 1921.

Application filed May 15, 1919. Serial No. 297,262.

*To all whom it may concern:*

Be it known that I, PAUL J. DELANEY, a citizen of the United States, and a resident of the borough of Manhattan, city, county, and State of New York, have made certain new and useful Improvements in Bake-Ovens, of which the following is a specification.

My invention relates to bake ovens and more particularly to that type thereof commonly known as portable reel ovens in which the heating medium is generally speaking, gas or the like. The object of my invention is to provide an improved construction in which heat radiation is reduced to a minimum and in which the heat emanating from the interior of the oven each time the oven door is opened is prevented from reaching the room in which the oven is located. Other more specific objects will appear from the description hereinafter disclosed the features of novelty will be pointed out in the appended claim.

Figure 1:
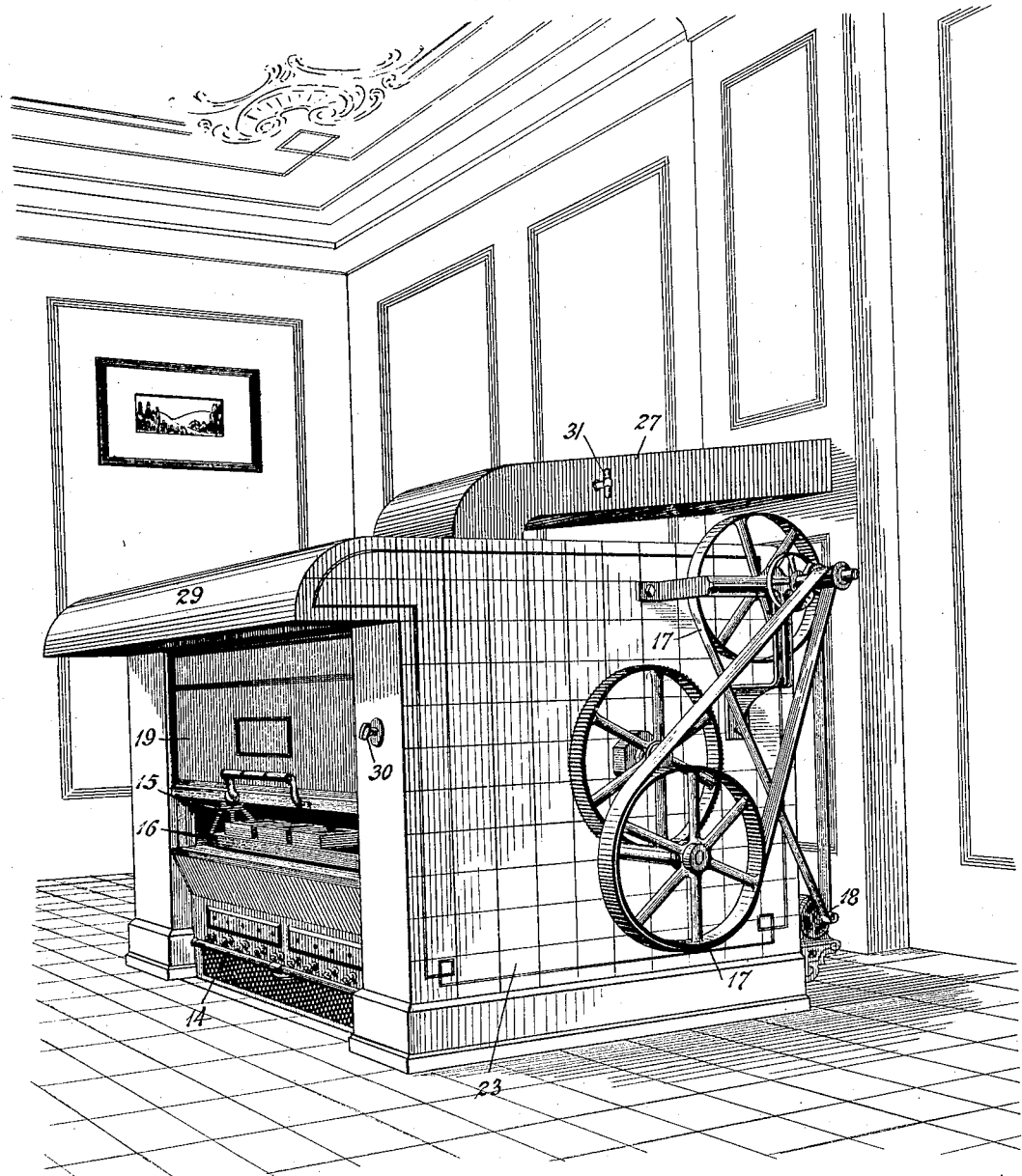
Figure 4:
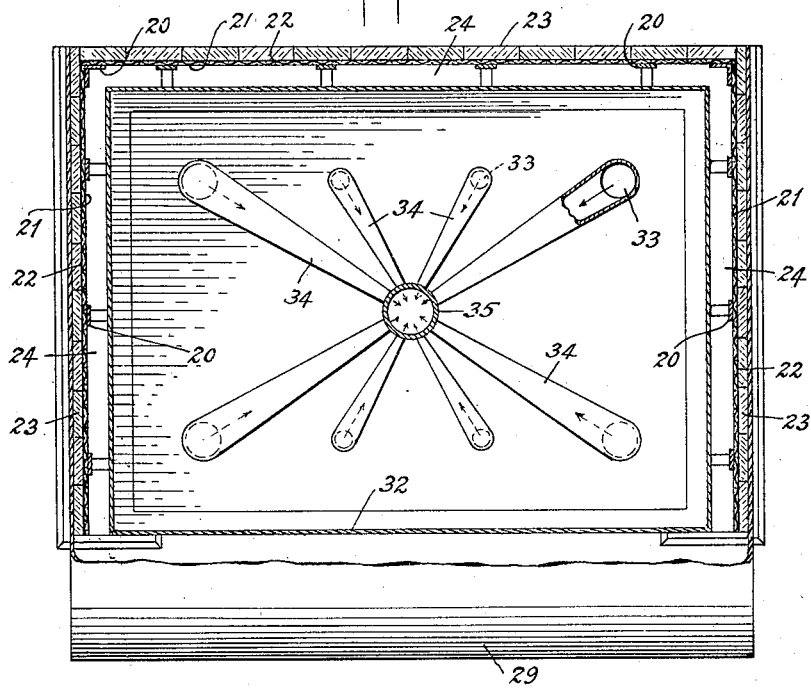
Figure 5:
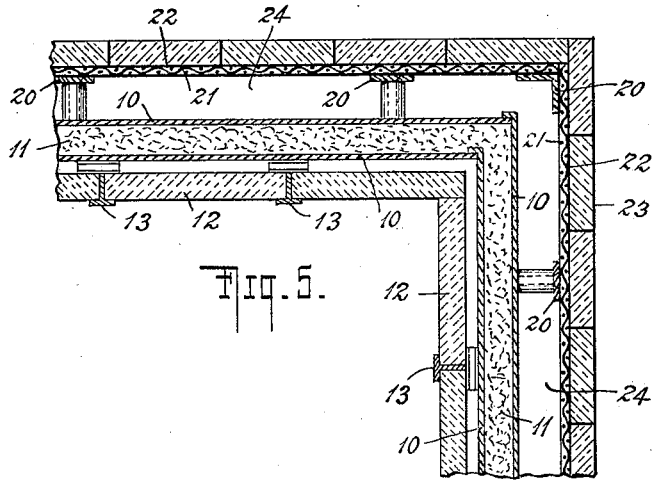

In the accompanying drawings, which for illustrative and descriptive purposes, show an example of my invention, Figure 1 is a perspective view; Fig. 2, is an elevation partly in section; Fig. 3 is a section on the line 3—3 of Fig. 2; Fig. 4 is a horizontal section on the line 4—4 of Fig. 2, and Fig. 5 is an enlarged detail section.

Ovens of the type in question comprise upright hollow walls 10 filled with a heat insulating material 11 such as asbestos or the like, and lined on the interior with tiles 12 of a material capable of retaining and radiating heat for a maximum period, said tiles 12 being suitably held in place between angle irons 13. The oven comprises further a heating apparatus 14 and a reel 15 rotatably mounted interiorly of the oven and carrying shelves 16 on which the material to be baked is circulated in the presence of the baking heat. The reel 15 is rotated by means of suitable mechanism 17 which in the illustrated example is electrically driven by means of a motor 18. A door 19 of any convenient construction controls the access to the interior of the oven from the front, and permits the material to be introduced into and removed from said oven.

As so far described the oven comprises the usual construction in which enough heat is radiated, after the oven has been in operation for a time, even though the walls 10 are insulated, to render the surroundings uncomfortable and to raise the temperature of the room in which the oven is located, to an uncomfortable degree, this being particularly true on days when the atmospheric temperature is high. Furthermore with such ovens each time the door 19 opens a certain amount of the interior heat and hot gases are permitted to escape into the room and thus add their effect to the temperature therein.

My invention overcomes these objectionable features by practically doing away with heat radiation and by preventing the interior heat or hot gases which escape from the oven, when the door 19 is open, from reaching the room in which the oven is located, in any noticeable quantities.

Thus in my improved construction angle irons 20 or other suitable supporting devices are located at proper intervals and at a distance from the outer surfaces of the walls 10 and serve to support or carry wire mesh fabric or the like 21 suitably secured thereto in upright position at a distance from the walls 10. The fabric 21 is covered with plaster or other suitable binder 22 in which tiles 23 of any desired material are laid to form incasing walls located at a distance from the outer surfaces of the walls 10 and providing air spaces 24 which may be connected with the atmosphere by means of suitably located openings 25. It will be understood that at the rear of the oven, the air space 24, may, if desired, be formed by spacing the oven from a wall of the chamber in which said oven is located, instead of building a separate wall of tiles 23 as shown. At their upper portions the spaces 24 communicate with a chamber 26 connected by means of a conduit 27 with a flue or chimney, a suitable exhaust fan or the like 28 being located somewhere in the connection; in the drawings the exhaust fan 28 has been shown diagrammatically in the conduit 27 for the purposes of illustration and description.

The chamber 26 terminates in a hood 29 which extends outwardly beyond the front of the oven and above the door 19, the chamber 26 excepting for this front opening and its connections with the conduit 27 and air spaces 24 being closed. The exhaust fan 28 may be driven electrically and controlled for instance by means of a switch 30 suitably located so as to be readily accessible. In the preferred construction a damper 31 of suitable construction is located in the conduit 27.

The chamber 26 is located above a hollow top member 32, constituting the top or roof of the oven, and having no connection or communication with the chamber 26. The top member 32 is provided with a plurality of openings 33, preferably of varying dimensions, which communicate with the interior of the oven, the illustrated example showing eight such openings 33, the larger being located in the vicinity of the corners of said oven, while the smaller ones are located at intermediate positions, as shown in Fig. 4. The openings 33 are connected by means of conduits 34 in the top member 32, with a pipe 35, which extends through the chamber 26 but has no communication therewith and connects either with the conduit 27 at a point beyond the fan 28, or with the flue or chimney previously mentioned, the connection in the latter case being independent of the conduit 27. The spaces in the hollow top member 31, between the conduits 34, are filled with a suitable insulating material 31ª, such as asbestos or the like as shown in Fig. 3.

The exhaust fan 28 may either be in continuous operation during use of the oven or it may be periodically started just prior to the opening of the door 19 through the medium of the switch 30. In either case a suction is created in the chamber 26 whereby the heated air and other hot gases are caused to pass up under the hood 29 into the chamber 26 and out through the conduit 27 into the flue or chimney each time the door 19 is opened. At the same time, if the damper 31 is wholly or partly open, the suction action of the exhaust fan or the like 28 withdraws the air from the air spaces 24 into the chamber 26 from which it passes through the conduit 27 to said flue or chimney, the air which is removed from the spaces 24 being replaced by fresh air which enters through the openings 25. In this way the heated air and other hot gases which emanate from the oven, each time the door 19 is opened, are removed quickly and before they have time to affect the temperature of the air which surrounds the oven. Coincidentally therewith the air which is in the air spaces 24 and which may have absorbed a certain amount of heat from the walls 10 may be withdrawn and replaced by fresh air. If the exhaust fan 28 is in continuous operation, and the damper 31 is open, a circulation is maintained in the air spaces 24 which prevents any heat which may be radiated from the walls 10 from having any effect upon the air surrounding the oven. In other words, the incasing walls 23 do not in any case become heated so that radiation of heat to the air in the room in which the oven is located is entirely avoided; such radiation as may take place from the walls 10 into the spaces 24 is nullified by the periodical or continuous operation of the exhaust fan 28. The suction in the air spaces 24 may be controlled by actuating the damper 31, and may be entirely discontinued by closing said damper, in which case the air spaces 24 become dead air spaces and thereby provide effective insulation against radiation of heat into the said room. The result is that the oven, when in operation, has no apparent effect upon the surrounding temperature and may thus be utilized as a window exhibit or in other visible locations where otherwise it would be objectionable because of the effect of the radiated heat upon the existing atmospheric temperature in the window or other location.

By providing the plurality of openings 33 in the roof of the oven and connecting them with the pipe 35 by means of the conduits 34, the escape of the heated air and other hot gases from the oven when closed and in operation, is even at all points thereof, which results in maintaining an even and uniform temperature in all parts of the interior of said oven, whereby the baking operation is of maximum efficiency and is finished in a minimum of time and at the same time produces more satisfactory and uniform results than is otherwise the case. The relatively larger dimensions of those openings 33 which are farthest removed from the pipe 35, insure an even escape of the heated gases at all points. The said heated air and other hot gases pass naturally through the openings 33 and conduits 34, and from thence through the pipe 35 to the aforesaid flue or chimney, or to the conduit 27, as the case may be. It will be understood, if the pipe 35 is connected with the conduit 27, that the connection is always at a point beyond the fan 28, so that the suction produced thereby is not effective in the pipe 35, or conduits 34.

My improved construction is efficient in construction and operation, and may be combined with existing ovens in an economic and simple manner; its use not only increases the efficiency of the oven, but permits it to be used for exhibition purposes without discomfort, where otherwise the operation of the oven would be objectionable and uncomfortable.

It will be understood that the reel 15 and its shelves 16 are actuated and utilized in the customary manner.

Various changes in the specific form shown and described may be made within the scope of the claim without departing from the spirit of my invention.

I claim:

In a bake oven of the kind described, a hollow member forming the top of the oven and provided with a plurality of openings located at predetermined points and communicating with the interior of the oven, a plurality of conduits connected with said openings, and a pipe connected with all of said conduits whereby hot gases escape from the interior of the oven coincidentally at a plurality of points.

In testimony whereof I have hereunto set my hand.

PAUL J. DELANEY.